United States Patent [19]

Charonnat

[11] Patent Number: 4,603,614
[45] Date of Patent: Aug. 5, 1986

[54] ELECTROMAGNETIC JIGSAW

[76] Inventor: Marcel Charonnat, 34 rue Sambre et Meuse, 75010 Paris, France

[21] Appl. No.: 612,843

[22] Filed: May 22, 1984

[30] Foreign Application Priority Data

May 25, 1983 [FR] France .................. 83 08616

[51] Int. Cl.⁴ ........................................... B27B 19/04
[52] U.S. Cl. ........................................ 83/752; 83/577; 83/784
[58] Field of Search .................... 83/575–577, 83/746, 784, 786, 752, 783; 310/21, 29, 32

[56] References Cited

U.S. PATENT DOCUMENTS

| 1,948,229 | 2/1934 | Young | 83/752 |
| 2,072,590 | 3/1937 | Lowry et al. | 83/577 X |
| 2,233,862 | 3/1941 | Dremel | 83/752 X |
| 2,602,475 | 7/1952 | Andrae et al. | |
| 2,646,089 | 7/1953 | Gaskell | 83/784 |
| 2,753,898 | 7/1956 | MacFarland | 83/752 X |
| 2,771,102 | 11/1956 | Carmichael | |
| 2,780,248 | 2/1957 | Andreae | 83/752 |
| 2,780,249 | 2/1957 | Andreae et al. | |
| 2,884,027 | 4/1959 | Pulera | |
| 3,360,704 | 12/1967 | Kohlhagen | 310/21 X |

FOREIGN PATENT DOCUMENTS

| 370107 | 4/1921 | Fed. Rep. of Germany . |
| 893125 | 5/1944 | France . |
| 484653 | 5/1938 | United Kingdom . |

Primary Examiner—Frank T. Yost
Attorney, Agent, or Firm—Steele, Gould & Fried

[57] ABSTRACT

The saw is of the type comprising a blade one of whose ends is firmly fixed to a plate capable of vibrating under the effect of an electro-magnet fed with AC current.

In accordance with the invention, the vibrating plate (3) is provided with at least one inertia mass (15).

The saw may be used by fixing the blade (5) only to the vibrating plate (3), by one of its ends, the other end remaining free.

9 Claims, 13 Drawing Figures

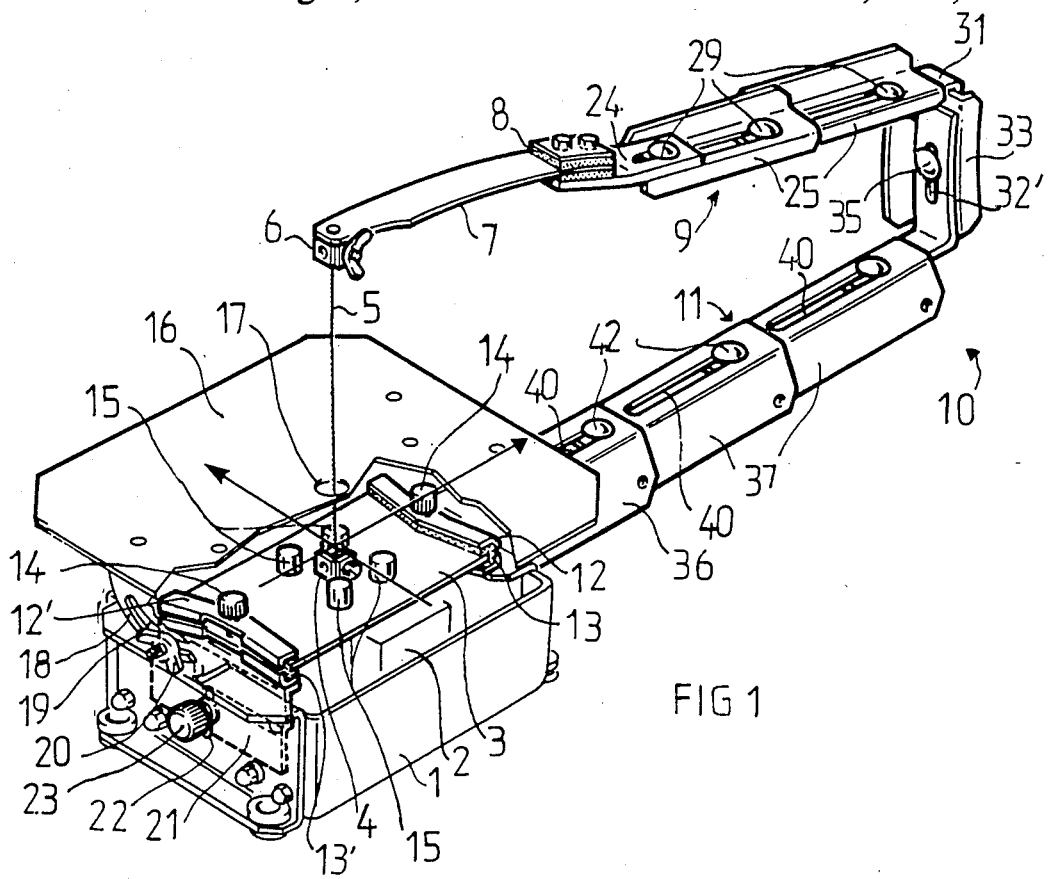
FIG 1
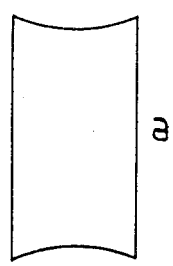
FIG 2a-f
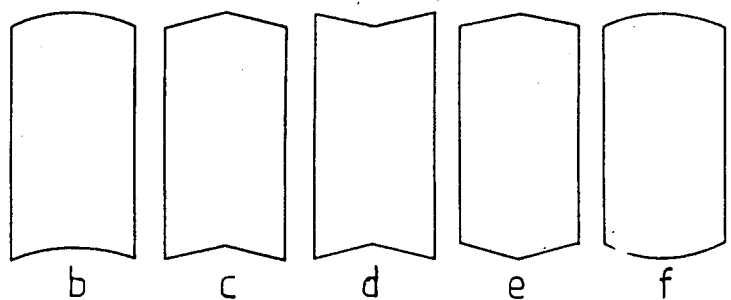

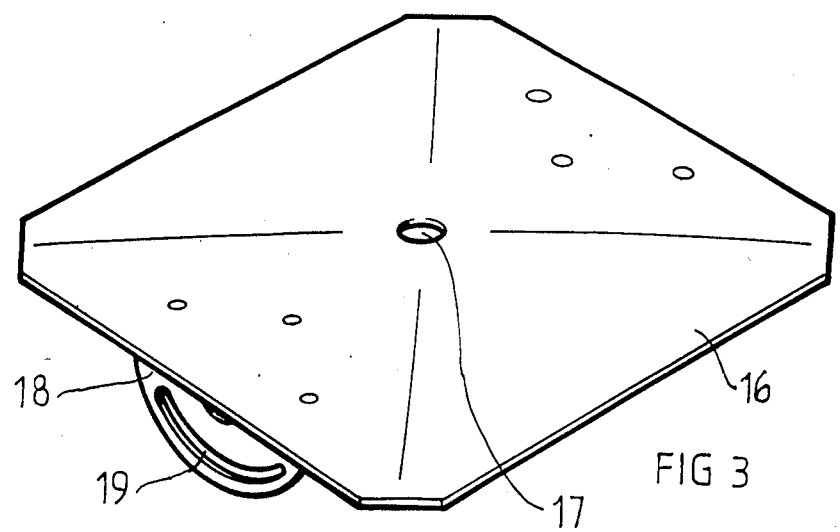
FIG 3
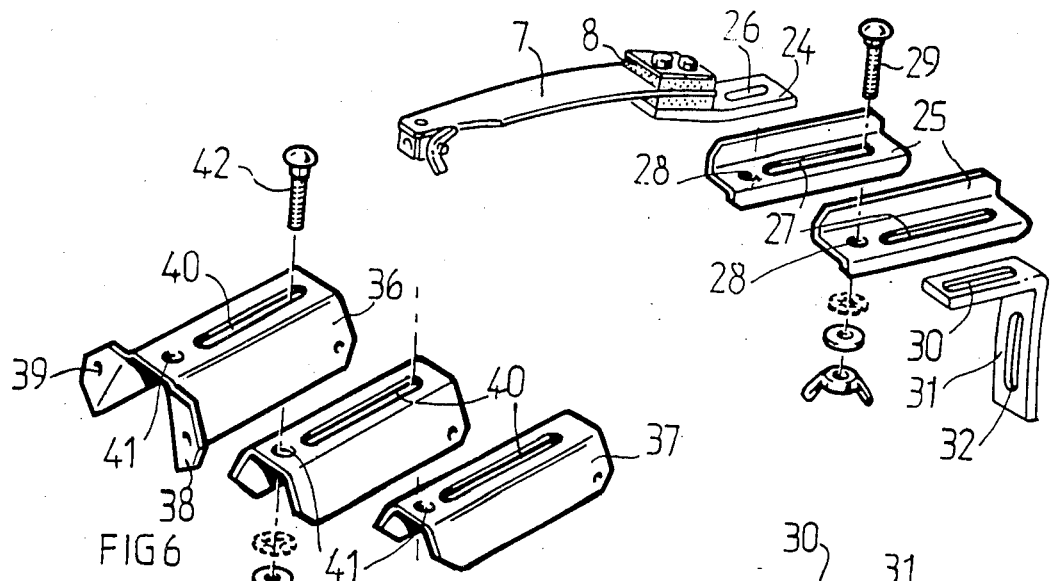
FIG 4
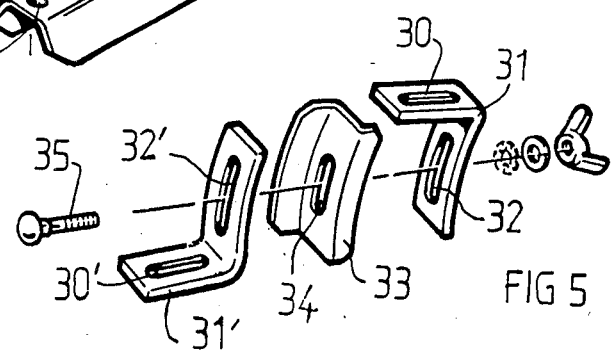
FIG 6
FIG 5

U.S. Patent   Aug. 5, 1986   Sheet 3 of 3   4,603,614
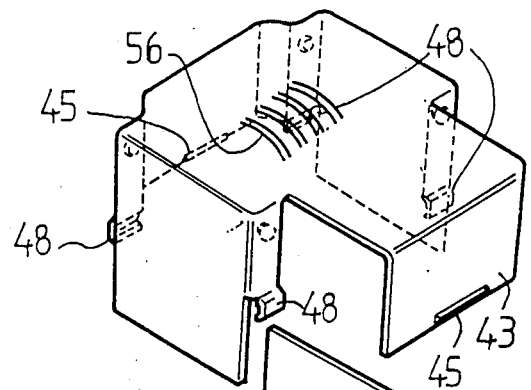
FIG 7
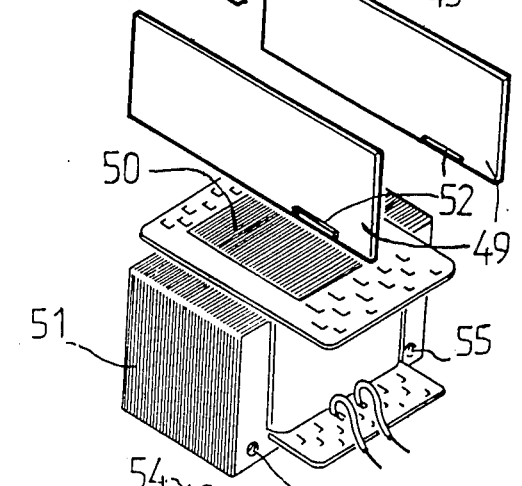
FIG 8
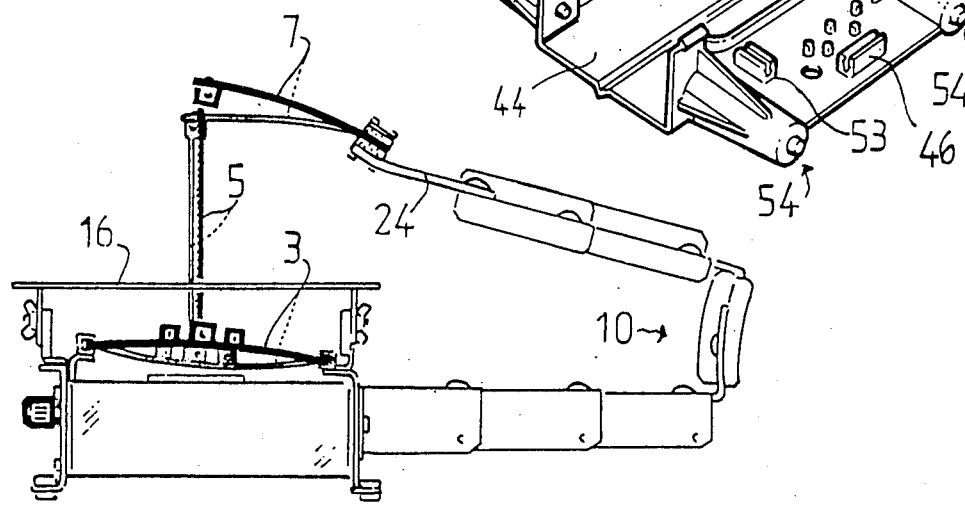

ELECTROMAGNETIC JIGSAW

The present invention relates generally to an electromagnetic jig-saw of the type comprising a blade one of whose ends is firmly secured to a plate vibratable under the effect of an electro-magnet fed with AC current.

In the known saws of this type, the other end of the blade is firmly fixed to the end of a spring arm having the general shape of a U and whose essential function is to tension the blade. One of the free ends of the arm is mounted on the case containing the mechanism of the saw and the other free end of the arm comprises means for temporarily securing the blade.

Besides the fact of increasing the space taken up by the saw, the presence of this arm obviously limits the distance between the edge of the material to be sawn and the zone effected by the sawing. It would of course be advantageous to be able to do without this arm under particular circumstances.

This objective is reached by the present invention in that it provides a jig-saw of the above mentioned type in which the vibrating plate is provided with at least one inertia mass.

This or these masses may be formed by small metal blocks which increase the inertia of the vibrating plate thus increasing its spring effect, which function is normally fulfilled by the U shaped arm. With this increase in the inertia of the vibrating plate a blade may be used which is joined only to said plate, the other end of the blade remaining free. It will be readily understood that thus it is possible to saw a material without being limited by the length of the arm and, also, to saw small pieces while taking up very little space.

In the presently known electro-magnetic saws, means are provided for varying the spacing between the vibrating plate and the electro magnet so as to modify, depending on requirements, the power of the vibrations: the further the vibrating plate is moved away from the electro magnet, the smaller is the power. Up to present, the means for varying the spacing maintain the parallelism between the vibrating plate and the electro-magnet. That only allows a small adjustment for either the vibrating plate is very close to the electro-magnet, in which case it adheres closely thereto and there is no longer any vibration or the plate is too far away from the electro magnet to react under the effect of this action.

According to the present invention, the means for varying the spacing between the vibrating plate and the electro-magnet only act on one of the sides of said plate.

Thus, the vibrating plate is moveable between a position parallel to the electro magnet and an oblique position. The part of the vibrating plate opposite the side on which the means for adjusting the spacing exert their action thus remains always in the zone of action thereof, so that a greater adjustment of the amplitude of the vibrations is possible than with known devices.

In existing jig-saws, the vibrating plate is held in position by engagement of two of its opposite sides in appropriate clamps. These clamps hold the plate suitably when the piece to be sawn is moved along an axis which is perpendicular thereto, but less efficiently when the piece to be sawn is moved transversely: in fact, the piece bears against the saw blade which transmits this force to the vibrating plate, which tends to slide out of the clamps. It follows that the base of the saw blade is off set and that the sawing accuracy is reduced. To overcome this disadvantage, in accordance with the invention, the opposite sides of the vibrating plate which are clamped are curved or form a broken line and the clamps have a complementary configuration.

Thus, when a transverse thrust is applied to the vibrating plate, the sides of the plate jammed in the clamps are locked in the complementary profile of these latter and the vibrating plate cannot slide.

In known jig-saws, above the vibrating plate is provided a receiving plate for receiving the material to be sawn, said plate having a hole for passing the saw blade therethrough.

So as to facilitate pivoting of the material to be sawn on the receiving plate, in accordance with the invention, this plate defines a surface projecting upwardly in the direction of said hole. The plate may for example be curved or slightly pyramidal, it being however of course understood that in the vicinity of the hole the plate may be flat. That reduces the contact surface between the plate and the material to be cut and facilitates movement thereof.

Although the saw of the invention offers the advantage of being able to operate without a U shaped arm, it is not always possible to do without such an arm. In particular, for carrying out very accurate work with a fine blade, the presence of an arm is necessary. The saw of the invention may then comprise one, of the above defined type, but which, as opposed to the previously known arms, is formed of telescopic elements. Thus, on the one hand, this arm may be contracted to a maximum for packing or for storing the saw and, on the other hand, it may be expanded to the maximum for passing large pieces to be sawn therethrough. The telescopic properties of the U shaped arm thus offer the advantage of allowing work to be carried out which is all the more accurate the more the arm is contracted, while allowing a large clearance if required.

So as to be able to use blades of very varied lengths or even broken blades, the element or elements forming the web of the U shaped arm have a curvature whose center is outside the zone included between the flanges and the web of the arm. Thus, for a reduced extension or contraction, much greater variations may be obtained of the distance between the ends of the flanges of the U shaped arm and so between the means for temporarily locking the blade.

In a preferred embodiment, the electro-magnet is included in an insulating case formed from a shell and a bottom, and insulating cheeks are placed between the winding and the E shaped metal plates of the electro-magnet.

Besides offering a double insulation, this arrangement considerably simplifies the assembly, reduces operating noises and prevents foreign bodies, for example pieces of a broken saw, from falling on the electro-magnet and damaging it.

Advantageously, the vibrating plate is separated from the upper face of the case of the electro-magnet by damping means which are preferably formed by at least one resilient blade integral with this upper face.

One embodiment of the invention, and variants thereof, are described hereafter with reference to the accompanying drawings in which:

FIG. 1 is a perspective view, partially exploded, of the jig-saw in accordance with the invention;

FIGS. 2a to 2f show different possible forms for the vibrating plate;

FIG. 3 shows, in detail, the plate for receiving the material to be sawn;

FIG. 4 shows the parts forming the upper flange of the U shaped arm;

FIG. 5 shows the parts forming the web of the U shaped arm;

FIG. 6 shows the parts forming the lower flange of the U shaped arm;

FIG. 7 shows the two positions which the saw assumes and the spring parts during jig-sawing, and FIG. 8 is an exploded view of the electro-magnet and one possible embodiment of its case.

Referring to FIG. 1, an electro-magnetic saw for jig-sawing is shown having a removable U shaped arm whose use is optional. The saw comprises a case 1 containing an electro-magnet shown schematically at 2 and above which is located a vibrating plate 3. The vibrating plate 3 is provided with a device 4 for temporarily fixing one of the ends of a saw blade 5 whose other end is received in a temporary securing device 6 integral with a spring blade 7. The spring blade 7 is itself mounted, with interpositioning of a damping material 8, at the end of one of the flanges 9 of a U shaped arm 10 whose other flange 11 is fixed to the case 1. The structure of the U shaped arm 10 will be described in detail further on.

Coming back to the vibrating plate 3, it can be seen that it is jammed, by two of its opposite sides, between two clamps 12 and 12', with interpositioning of a damping material 13—13', the spacing between the jaws of clamps 12 and 12' being adjustable by means of a screw 14.

Four inertia masses are firmly secured to the vibrating plate 3.

A plate 16, adapted to receive the material to be sawn, is mounted above the vibrating plate 3 and it comprises a hole 17 for passing the saw blade 5 therethrough. As can be seen, this plate has on one side a lug 18 in which is formed a slit 19 in the shape of an arc of a circle through which passes a locking screw 20. It will be readily understood that plate 16 may pivot and be held in the chosen position by cooperation between slit 19 and the screw-wing nut pair 20. Furthermore, as can be seen from FIG. 3, plate 16 has the form of a very flat truncated pyramid in the vicinity of hole 17.

The lower jaw of clamp 12' is extended by a bracket 21, shown with a broken line, comprising a slit 22 with which a knurled knob 23 cooperates. This knob is used for raising and lowering bracket 21 and so clamp 12' and the corresponding side of the vibrating plate 3.

With reference to FIG. 2, it can be seen that the opposite sides of the vibrating plate 3, affected by clamps 12 and 12', may have different shapes. Thus, these sides may be biconcave (FIG. 2a), biconvex (FIG. 2f), concave and convex (FIG. 2b), form two reentering angles (FIG. 2d), two outgoing angles (FIG. 2e) or a reentering angle and an outgoing angle (FIG. 2c).

The embodiments which are preferred are those shown in FIGS. 2a and 2b. In FIG. 1, a vibrating plate is used such as shown in FIG. 2a and, as can be seen, the jaws of clamps 12 and 12' have a configuration complementary to that of the biconcave sides of plate 3.

As mentioned above, the U shaped arm 10 is formed from telescopic elements. The structure of these elements can be clearly seen in FIGS. 4 to 6. Thus, if we refer to FIG. 4, it can be seen that the upper flange 9 of the U shaped arm 10 is formed from a support 24 for the spring blade 7 and from two telescopic elements 25.

Support 24 has a slot 26 and elements 25 a slot 27 and a bore 28. These elements are of course joined together by passing a first screw (not shown) into the slot 26 of element 24 and into bore 28 of the first element 25, a second screw 29 into the slot 27 of the first element 25 and the bore 28 of the second element 25 and a third screw (not shown) into the slot 27 of the second element 25 and into the slot 20 of an L shaped part 31 belonging to the web of the U shaped arm.

It is evident that by adjusting the position of the three screws in slots 26, 27 and 30, the parts forming the upper flange 9 of the U shaped arm 10 may be contracted or closed up to a greater or lesser degree.

The web of the U shaped arm is formed from two L shaped parts 31 and 31' which are identical but orientated differently. It is clear that part 31 of FIG. 5 is the same as part 31 of FIG. 4. Besides a slot 30—30', parts 31—31' comprise a slot 32—32'. Between the L shaped parts 31—31' is engaged a piece 33 in the shape of a Z having a slot 34. Parts 31, 33 and 31' are joined together by passing a screw 35 through slots 32', 34 and 32 in facing relation, it of course being understood hereagain that the length of the web of the U shaped arm may be varied by adjusting the relative position of the screws and the slots.

As can be seen, the parts forming the web of the U shaped arm are slightly curved for the reason mentioned above.

The lower flange 11 of the U shaped arm 10 is formed from a connecting piece 36 and from two telescopic elements 37. The connecting piece 36 has lugs 38 with bores 39 for mounting the U shaped arm 10 on the face 1 of the apparatus. The connecting piece 36 and the telescopic elements 37 are each provided with a slot 40 and a bore 41. The parts forming the lower flange of the U shaped arm 10 are joined together by fitting a first screw 42 into the slot 40 of the connecting piece 36 and the bore 41 of the first element 37 and by fitting a second screw (not shown) into the slot 40 of the first element 37 and the bore 41 of the second element 37. As in the case of the upper flange and the web, the length of the lower flange of the U shaped arm 10 may be adjusted by modifying the relative positions of screws 42 in slots 40.

Turning to FIG. 8, a possible embodiment of case 1 may be seen. This case is formed by a shell 43 and a bottom 44 which are snap-fitted together. For this, two opposite vertical walls of shell 43 are provided with projections 45 adapted to penetrate forcible into retaining gutters 46 provided in bottom 44, whereas this same bottom comprises vertical walls ending in hook-shaped projections 47 adapted to cooperate with projections 48 of a complementary shape provided in shell 43.

Insulating cheeks 49 are fitted between coil 50 and the E shaped elements 51 of the electro-magnet 2. These cheeks 49 comprise a projecting part 52 adapted to snap fit into retaining gutters 53 provided in bottom 44. The final interlocking of the assembly is achieved by means of screws (not shown) passing through the grooves 54 of bottom 44 and the aligned bores 55 provided in the E shaped elements 51.

On the upper face of shell 43 is provided a series of resilient blades 46 continuous with the shell and whose purpose is to prevent vibrations from being transmitted from the vibrating plate 3 to shell 43.

The operation of the saw in accordance with the invention is as follows:

When it is delivered, the U shaped arm is completely retracted, that is to say that screws 29 and 42 occupy the position opposite the one shown in FIG. 1. Screw 35 passes through the middle of slots 32', 34 and 32. If it is desired to use the jig-saw without using arm 10, it is sufficient to unscrew the connecting piece 36 from case 1. If, on the contrary, it is desired to leave arm 10 in position, its length and the spacing between its flanges are adjusted by adjusting screws 29, 35 and 42.

A blade 5 is inserted in the temporary fixing device 4 depending from the vibrating plate 3 and, if required, in the temporary fixing device 6 depending from the spring blade 7.

Depending on the nature and the thickness of the material to be sawn, and the work to be carried out, the power and the amplitude of the vibrations of blade 5 are adjusted. In so far as the power is concerned, the spacing between the vibrating plate 3 and the electro-magnet 2 is adjusted by raising bracket 21 by means of the knurled knob 23. As concerns the amplitude, the vibrating plate 3 is tightened or released to a greater or lesser degree in clamps 12 and 12' by adjusting screws 14.

If required, the position of plate 16 is modified by unscrewing screw 20, by slanting plate 16 and by locking it in position by tightening screw 20 again.

Supplying the electro-magnet 2 with AC current causes, in synchronism with the periods of the current, a succession of attractions of plate 3 and cessations of attractions which result in vibration of plate 3.

The amplitude of this vibration is accentuated by the spring effect of the inertia masses 15 provided on the vibrating plate 3 in the sense that these masses 15, by increasing the inertia of the vibrating plate 3, amplify its spring effect and restore a force which is transmitted to the saw blade. The spring effect is increased by the spring blade 7 if arm 10 is used. The damping material 8, which may be formed from rubber foam, felt, etc . . . prevents the vibrations from being transmitted to arm 10 then fed, in the form of parasite vibrations, to blade 5. Thus the premature wear of blade 5 and the risks of breakage are limited.

Because the vibrating plate 3 is correctly held in clamps 12, 12', due to the particular shape of the opposite sides of the plate gripped by the clamps, it is possible to push the material to be sawn in the directions shown by arrows in FIG. 1, without the vibrating plate 3, and consequently blade 5, shifting with respect to the hole 17 in plate 16.

In some cases, it may be advantageous to adjust the U shaped arm 10 so that the temporary locking means 6 are slightly closer to the vertical passing through the side of plate 3 opposite arm 10 than the temporary locking means 4. It follows that, at rest, blade 5 is slanted in the direction of this vertical. Thus, blade 5 may be given a vertical direction when jig-sawing, the treated material pushing the blade towards the U shaped arm.

As is clear from FIG. 7, each vibration causes the spring effect parts of the saw (spring blade 7, saw blade 5 and vibrating plate 3) to pass from a high position set back towards the U shaped arm to a low projected position.

Thus the teeth of the saw may bite into the material when they pass from the high position to the low position and withdraw from the material when they pass from the low position to the high position.

The saw of the invention is more particularly intended for cutting wood or a similar material for inlaid work, patterns, scale models, but also for cutting up frozen products and for carrying out ornamental, decorating or fitting work for dwellings.

Of course the invention is not limited to the embodiments described and shown. In particular, the number of telescopic elements forming the arm could be greater or smaller, the opposite sides of the vibrating plate could have any other shape fulfilling an equivalent function, etc . . . .

I claim:

1. An electro-magnetic jig-saw, comprising:
   a blade having an upper end and a lower end;
   a plate vibrated by an electro-magnet supplied with AC current, the plate having two pairs of opposite edges and the plate being spaced, at rest, from the electro-magnet;
   fastening means securing said lower end of the blade to the plate;
   at least one inertia mass formed by a weight affixed to the plate; and,
   means for varying the spacing between the vibrating plate and the electro-magnet, acting only on a portion of the plate adjacent to said edges.

2. The saw according to claim 1 comprising, above the vibrating plate, a plate for receiving the material to be cut up, said plate having a hole for passing the saw blade therethrough, characterized in that this plate (16) defines a surface projecting upwardly in the direction of said hole (17).

3. The saw according to claim 1, wherein the vibrating plate has two pairs of opposite edges and is held in position by two of its opposite edges being gripped in clamp means, said opposite edges being curved and said clamp means having a complementary configuration to said edges.

4. The saw according to claim 1, wherein the upper end of the blade is firmly fixed to an end of a spring arm formed from telescopic elements, the arm having the general shape of a U.

5. The saw according to claim 1, wherein the upper end of the blade is firmly fixed to an end of a spring arm having the general shape of a U, with two substantially parallel flanges linked by web elements, the web elements having a curvature the center of which curvature is outside a zone defined between said parallel flanges and the web elements of the U-shaped arm.

6. The saw according to claim 1, wherein the electro-magnet comprises a coil and E-shaped elements, said electro-magnet being contained in an insulating case formed from a shell and a bottom, and insulating bodies being inserted between the coil and the E-shaped elements of the electro-magnet.

7. The saw according to claim 1, wherein the electro-magnet is contained in a case having an upper face, the vibrating plate being separated from said upper face by damping means formed by at least one resilient blade integral with said upper face.

8. The saw according to claim 1, wherein the vibrating plate has two pairs of opposite edges and is held in position by two of its opposite edges being gripped in clamp means, said opposite edges forming a broken line and the clamp means having a complementary configuration to said opposite edges.

9. An electro-magnetic jig-saw, comprising:
   a blade having two ends, one of the ends being secured to a plate, the plate being vibrated by an electro-magnet supplied with AC current;
   a receiving plate for receiving the material to be cut, said receiving plate being disposed above the vibrating plate and having a hole for passing the blade therethrough, the receiving plate defining a surface projecting upwardly in a direction of said hole.

* * * * *